US008739976B2

(12) United States Patent
Ishizuka et al.

(10) Patent No.: US 8,739,976 B2
(45) Date of Patent: Jun. 3, 2014

(54) CRYSTALLINE POLYMER MICROPOROUS MEMBRANE, METHOD FOR PRODUCING THE SAME, AND FILTERATION FILTER

(75) Inventors: Kenichi Ishizuka, Kanagawa (JP); Nobuhiro Nishita, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 723 days.

(21) Appl. No.: 12/954,297

(22) Filed: Nov. 24, 2010

(65) Prior Publication Data

US 2011/0120938 A1  May 26, 2011

(30) Foreign Application Priority Data

Nov. 25, 2009  (JP) ................. 2009-267683

(51) Int. Cl.
*B01D 71/36* (2006.01)
*B01D 63/00* (2006.01)
*B01D 67/00* (2006.01)
*B01D 5/00* (2006.01)

(52) U.S. Cl.
USPC ............... 210/500.27; 210/490; 210/500.36; 210/500.37; 210/493.1; 210/493.5; 264/48; 427/244

(58) Field of Classification Search
CPC ........... B01D 2313/44; B01D 2323/30; B01D 2325/022; B01D 63/061; B01D 63/067; B01D 67/0093; B01D 71/36; B05D 5/00; B05D 5/12
USPC ............... 210/490, 500.27, 500.38, 500.36, 210/500.34, 650, 645, 493.1, 500.37, 210/493.5; 264/48; 427/244; 521/145
See application file for complete search history.

(56) References Cited

U.S. PATENT DOCUMENTS

| | | | |
|---|---|---|---|
| 1,421,341 A | 6/1922 | Zsigmondy et al. | |
| 2,783,894 A | 3/1957 | Lovell et al. | |
| 4,196,070 A | 4/1980 | Chao et al. | |
| 4,248,924 A * | 2/1981 | Okita | 428/212 |
| 5,091,086 A * | 2/1992 | Stengaard | 210/490 |
| 5,209,850 A * | 5/1993 | Abayasekara et al. | 210/500.36 |
| 5,503,746 A * | 4/1996 | Gagnon | 210/490 |
| 6,235,377 B1 * | 5/2001 | Dillon et al. | 428/212 |
| 8,011,518 B2 * | 9/2011 | Hokazono et al. | 210/500.36 |
| 2002/0027102 A1 * | 3/2002 | Robillard | 210/493.1 |
| 2003/0089660 A1 * | 5/2003 | Huang et al. | 210/500.36 |
| 2008/0245736 A1 * | 10/2008 | Charkoudian et al. | 210/650 |
| 2009/0075013 A1 * | 3/2009 | Sugiyama et al. | 428/64.4 |
| 2009/0159526 A1 * | 6/2009 | Okada et al. | 210/493.5 |

(Continued)

FOREIGN PATENT DOCUMENTS

| | | |
|---|---|---|
| DE | 3003400 | 8/1980 |
| GB | 2041821 | 9/1980 |

(Continued)

OTHER PUBLICATIONS

Japanese Office Action "Notification of Reasons for Refusal" dated Mar. 5, 2013, which corresponds to Japanese Patent Application No. 2009-267683 and is related to U.S. Appl. No. 12/954,297 with partial English translation.

*Primary Examiner* — Ana Fortuna
(74) *Attorney, Agent, or Firm* — Studebaker & Brackett PC

(57) ABSTRACT

A crystalline polymer microporous membrane containing a crystalline polymer microporous film containing a crystalline polymer, and having an asymmetric pore structure; fluorine alcohol covering at least part of an exposed surface of the crystalline polymer microporous film; and a crosslinking agent, wherein the fluorine alcohol is crosslinked with assistance of the crosslinking agent.

18 Claims, 4 Drawing Sheets

(56) References Cited

U.S. PATENT DOCUMENTS

| | | | |
|---|---|---|---|
| 2011/0073541 A1* | 3/2011 | Ishizuka et al. | 210/500.37 |
| 2011/0120937 A1* | 5/2011 | Ishizuka et al. | 210/493.1 |
| 2011/0120938 A1* | 5/2011 | Ishizuka et al. | 210/493.5 |

FOREIGN PATENT DOCUMENTS

| | | |
|---|---|---|
| JP | H06-228359 A | 8/1994 |
| JP | 07-207049 | 8/1995 |
| JP | 09-511948 | 12/1997 |
| JP | 2007-503862 A | 3/2007 |
| JP | 2007-313391 A | 12/2007 |
| JP | 2007-332342 A | 12/2007 |
| JP | 2008-037912 A | 2/2008 |
| JP | 2009-119412 A | 6/2009 |
| WO | 95/29008 | 11/1995 |

* cited by examiner

CRYSTALLINE POLYMER MICROPOROUS MEMBRANE, METHOD FOR PRODUCING THE SAME, AND FILTERATION FILTER

BACKGROUND OF THE INVENTION

1. Field of the Invention

The present invention relates to a crystalline polymer microporous membrane, a method for producing the crystalline polymer microporous membrane, and to a filtration filter using such crystalline polymer microporous membrane.

2. Description of the Related Art

Microporous membranes have long since been known and widely used for filtration filters, etc. As such microporous membranes, there are, for example, a microporous membrane using cellulose ester as a material thereof (see U.S. Pat. No. 1,421,341), a microporous membrane using aliphatic polyamide as a material thereof (see U.S. Pat. No. 2,783,894), a microporous membrane using polyfluorocarbon as a material thereof (see U.S. Pat. No. 4,196,070), a microporous membrane using polypropylene as a material thereof (see West German Patent No. 3,003,400), and the like.

These microporous membranes are used for filtration and sterilization of washing water for use in the electronics industries, chemical for semiconductor production, water for medical use, water for pharmaceutical production processes and water for use in the food industry. In recent years, the applications of and amount for using microporous membranes have increased, and microporous membranes have attracted great attention because of their high reliability in trapping particles. Among these, microporous membranes made of crystalline polymers are superior in chemical resistance, and in particular, microporous membranes produced by using polytetrafluoroethylene (PTEF) as a raw material are superior in both heat resistance and chemical resistance. Therefore, demands for such microporous membranes have been rapidly growing.

Generally speaking, microporous membranes have a low filtration flow rate (i.e., a short lifetime) per unit area. In the case where the microporous membranes are used for industrial purposes, it is necessary to align many filtering units to increase the membrane areas. For this reason, a reduction in the cost for the filtering process is appreciated, and thus an extension of the filtering lifetime is desired. To this end, there are various proposals for a microporous membrane effective for preventing or slowing down reductions in flow rate due to clogging, such as an asymmetric membrane in which pore diameters are gradually reduced from the inlet side to the outlet side.

Moreover, another proposal is a microporous membrane of a crystalline polymer, which has a larger average pore diameter on a surface of the film than that on the back surface thereof, and has the pores whose average diameter continuously changes from the surface to the back surface (see Japanese Patent Application Laid-Open (JP-A) Nos. 2007-332342). According to this proposal, fine particles are efficiently captured by the filter and the lifetime of the filter is improved, by performing filtration using, as the inlet side, the plane (i.e. the surface) having the larger average pore diameter.

A hydrophilization method of a crystalline polymer microporous membrane having an asymmetric pore structure proposed in JP-A No. 2009-119412 is that an exposed surface of a crystalline polymer microporous membrane having an asymmetric pore structure is subjected to a hydrophilization treatment, such as by immersion in aqueous solution of hydrogen peroxide or water-soluble solvent, laser irradiation, or chemical etching.

However, in the case of the crystalline polymer microporous membrane having an asymmetric pore structure, the membrane has a heated surface, unheated surface, and an inner part in between these surfaces, and the polymerization degree of the crystalline polymer varies in each area. The aforementioned hydrophilization methods cannot uniformly hydrophilize the entire membrane of such structure, and a hydrophilization process needs to be performed on each area separately depending on the polymerization degree thereof so as to uniformly hydrophilize the entire membrane, and the requirement for these separate hydrophilization processes results in low efficiency. Moreover, the membranes hydrophilized by these methods do not have sufficient hydrophilicity, and the filtration flow rate and lifetime thereof are also insufficient. In addition, the hydrophilization method by applying an ultraviolet laser beam and ArF laser beam has a problem such that the radiation of the ultraviolet laser beam and ArF laser beam may damage the membrane, and thus the strength of the membrane may be decreased.

As a hydrophilization method of a crystalline polymer microporous membrane a method disclosed in JP-A No. 2007.503862 proposes modification at least part of an exposed surface of the porous membrane which contains a cationic polymerizable monomer and a cationic polymerization initiator by polymerizing the cationic polymerizable monomer. Moreover, it proposes that the crystalline polymer microporous membrane may further contain a functional monomer containing quaternary ammonium salt, etc.

However, in this proposal the crystalline polymer microporous membrane has poor alkali resistance, and filtration rate, and life time of the porous membrane cannot be improved to a satisfiable degree.

Moreover, recently in semiconductor production, in order to obtain ultra-ultrapure water having outstandingly high purity for use in the semiconductor production, a filter capable of simultaneously capturing fine particles and metal ions existing in a concentration of less than ppm is desired. Particularly, desired is a precision filtration filter having capturing ability of metal ions, and high resistance to chemicals such as acid, alkali, and an oxidizing agent, and causing less eluted material. For such purpose, conventionally, it has been attempted to give ion exchange function and/or ion adsorption ability to a microporous membrane itself. As the crystalline polymer microporous membrane having the ion adsorption ability, proposed in JP-A No. 09-511948 is a porous membrane containing a functional group reactive with a polar group activated in the membrane, and provided with any ligand having affinity to a specific ion.

However, the bond between the ligand and the membrane is poor in alkali resistance, such as amide bonding, ester bonding. There is a problem of difficulty in use of the membrane in a semiconductor washing step, or the like. There is also problem that numberless steps are necessary for bonding the ligand, and that the filtration flow rate, and life time of the porous membrane cannot be improved to a satisfiable degree.

As the crystalline polymer microporous membrane having the ion adsorption ability, proposed is a porous membrane on which surface a functional group for capturing is introduced, wherein at least part of epoxy groups is substituted with a chelate-forming group or an ion-exchange group (see JP-A No. 2007-313391).

However, in this proposal, it is essential to use a compound substantially having an ester bonding, and there is a problem that alkali resistance is poor, and filtration flow rate, and life time of the porous membrane cannot be improved to a satisfiable degree.

Moreover, a method for modifying a surface of polyethylene terephthalate or polyethylene naphthalate by fixing a fluorine compound and a crosslinking agent having an isocyanate group on the polyethylene terephthalate or polyethylene naphthalate is proposed (JP-A No. 2008-37912).

However, in this proposal, since the functional group bonding with the fluorine compound does not exist on a surface of a polymer, metal ions cannot be captured.

There is a proposal of a method for improving wettability and chemical resistance of a fluorine resin molded product by covering a surface of the fluorine resin molded product with an alcohol solution containing an ultraviolet absorbing compound and a fluorosurfactant (JP-A No. 07-207049).

However, since this proposed fluorine resin molded product is not a porous membrane of a crystalline polymer, metal ions cannot be captured. There is also a problem that water resistance, acid resistance and alkali resistance are insufficient, since the ultraviolet absorbing compound is not crosslinked onto the fluorine resin molded product.

Accordingly, there is currently a demand for a crystalline polymer microporous membrane having high water resistance, high acid resistance, high alkali resistance, high ion adsorption ability, high hydrophilicity, long lifetime as a filter, and excellent filtration flow rate, a method for producing a crystalline polymer microporous membrane, which can efficiently produce the aforementioned crystalline polymer microporous membrane, and to a filtration filter using the aforementioned crystalline polymer microporous membrane.

BRIEF SUMMARY OF THE INVENTION

An object of the present invention is to provide a crystalline polymer microporous membrane having high water resistance, high acid resistance, high alkali resistance, high ion adsorption ability, high hydrophilicity, long lifetime as a filter, and excellent filtration flow rate, to provide a method for producing a crystalline polymer microporous membrane, which can efficiently produce the aforementioned crystalline polymer microporous membrane, and to provide a filtration filter using the aforementioned crystalline polymer microporous membrane.

Means for solving the aforementioned problems are as follows.
<1> A crystalline polymer microporous membrane containing: a crystalline polymer microporous film containing a crystalline polymer, and having an asymmetric pore structure; fluorine alcohol covering at least part of an exposed surface of the crystalline polymer microporous film; and a crosslinking agent, wherein the fluorine alcohol is crosslinked with assistance of the crosslinking agent.
<2> The crystalline polymer microporous membrane according to <1>, wherein the fluorine alcohol contains two or more hydroxyl groups.
<3> The crystalline polymer microporous membrane according to any one of <1> and <2>, further containing a functional compound containing at least one selected from the group consisting of an ion-exchange group, a chelate group, and derivatives thereof, wherein the functional compound is attached to part of at least one of the crosslinking agent and the fluorine alcohol by addition reaction.
<4> The crystalline polymer microporous membrane according to any one of <1> to <3>, wherein the crosslinking agent is a polyfunctional epoxy compound having two or more functional groups per molecule.
<5> The crystalline polymer microporous membrane according to any one of <1> to <4>, wherein at least part of the exposed surface of the crystalline polymer microporous film is covered with the functional compound.
<6> The crystalline polymer microporous membrane according to <5>, wherein the functional compound contains at least one selected from the group consisting of an ion-exchange group, a chelate group, and derivatives thereof, and contains a reactive group which reacts with at least one of the fluorine alcohol and the crosslinking agent.
<7> The crystalline polymer microporous membrane according to <6>, wherein the reactive group is at least one selected from the group consisting of an amino group, a hydroxyl group, an epoxy group and derivatives thereof.
<8> The crystalline polymer microporous membrane according to any one of <1> to <7>, wherein the crystalline polymer forming the crystalline polymer microporous membrane is at least one selected from the group consisting of polytetrafluoroethylene, polyvinylidene fluoride, a tetrafluoroethylene-perfluoroalkylvinyl ether copolymer, a tetrafluoroethylene-hexafluoropropylene copolymer, a tetrafluoroethylene-ethylene copolymer, polychlorotrifluoroethylene, a chlorotrifluoroethylene-ethylene copolymer, polyethylene, polypropylene, nylon, polyacetal, polybutylene terephthalate, polyethylene terephthalate, syndiotactic polystyrene, polyphenylene sulfide, polyether ether ketone, wholly aromatic polyamide, wholly aromatic polyester, and polyethernitrile.
<9> The crystalline polymer microporous membrane according to any one of <1> to <8>, wherein the crystalline polymer microporous membrane has a plurality of pores, where the average pore diameter of a first surface of the crystalline polymer microporous membrane is larger than that of a second surface thereof, and the average pore diameter of the crystalline polymer microporous membrane continuously changes from the first surface thereof to the second surface thereof.
<10> The crystalline polymer microporous membrane according to any one of <1> to <9>, wherein the crystalline polymer microporous membrane is a membrane obtained by heating one surface of the film containing the crystalline polymer so as to form a semi-baked film with a temperature gradient in the thickness direction thereof, and drawing the semi-baked film.
<11> The crystalline polymer microporous membrane according to any one of <9> to <10>, wherein the second surface is a heating surface.
<12> A method for producing a crystalline polymer microporous membrane, including: applying at least fluorine alcohol and a crosslinking agent to at least part of an exposed surface of a crystalline polymer microporous film; and crosslinking the fluorine alcohol with assistance of the crosslinking agent, wherein the crystalline polymer microporous film has an asymmetric pore structure.
<13> The method for producing a crystalline polymer microporous membrane according to <12>, wherein the fluorine alcohol contains two ore more hydroxyl groups per molecule.
<14> The method for producing a crystalline polymer microporous membrane according to any one of <12> and <13>, further containing allowing a functional compound to initiate an addition reaction with part of at least one of the crosslinking agent and the fluorine alcohol.
<15> The method for producing a crystalline polymer microporous membrane according to any one of <12> to <14>, wherein the crosslinking agent is a polyfunctional epoxy compound having two or more functional groups per molecule.

<16> The method for producing a crystalline polymer microporous membrane according to any one of <12> to <15>, wherein at least part of the exposed surface of the crystalline polymer microporous film is covered with the functional compound.

<17> The method for producing a crystalline polymer microporous membrane according to any one of <16>, wherein the functional compound contains at least one selected from the group consisting of an ion-exchange group, a chelate group, and derivatives thereof, and contains a reactive group which reacts with at least one of the fluorine alcohol and the crosslinking agent.

<18> The method for producing a crystalline polymer microporous membrane according to <17>, wherein the reactive group is at least one selected from the group consisting of an amino group, a hydroxyl group, an epoxy group and derivatives thereof.

<19> The method for producing a crystalline polymer microporous membrane according to any one of <12> to <18>, wherein the crystalline polymer forming the crystalline polymer microporous membrane is at least one selected from the group consisting of polytetrafluoroethylene, polyvinylidene fluoride, a tetrafluoroethylene-perfluoroalkylvinyl ether copolymer, a tetrafluoroethylene-hexafluoropropylene copolymer, a tetrafluoroethylene-ethylene copolymer, polychlorotrifluoroethylene, a chlorotrifluoroethylene-ethylene copolymer, polyethylene, polypropylene, nylon, polyacetal, polybutylene terephthalate, polyethylene terephthalate, syndiotactic polystyrene, polyphenylene sulfide, polyether ether ketone, wholly aromatic polyamide, wholly aromatic polyester, and polyethernitrile.

<20> A filtration filter containing the crystalline polymer microporous membrane according to any one of <1> to <11>.

<21> The filtration filter according to <20>, wherein the crystalline polymer microporous membrane has a pleated shape.

<22> The filtration filter according to any one of <20> and <21>, wherein the crystalline polymer microporous membrane has a plurality of pores, where the average pore diameter of the first surface of the crystalline polymer microporous membrane is larger than that of the second surface thereof, and the average pore diameter of the crystalline polymer microporous membrane continuously changes from the first surface thereof to the second surface thereof, and the first surface of the crystalline polymer microporous membrane is a filtering surface.

The present invention solves the aforementioned various problems in the art, achieves the aforementioned object, and can provide: a crystalline polymer microporous membrane having high water resistance, high acid resistance, high alkali resistance, high ion adsorption ability, high hydrophilicity, long lifetime as a filter, and excellent filtration flow rate; a method for producing a crystalline polymer microporous membrane, which can efficiently produce the aforementioned crystalline polymer microporous membrane; and a filtration filter using the aforementioned crystalline polymer microporous membrane.

Figure 1:
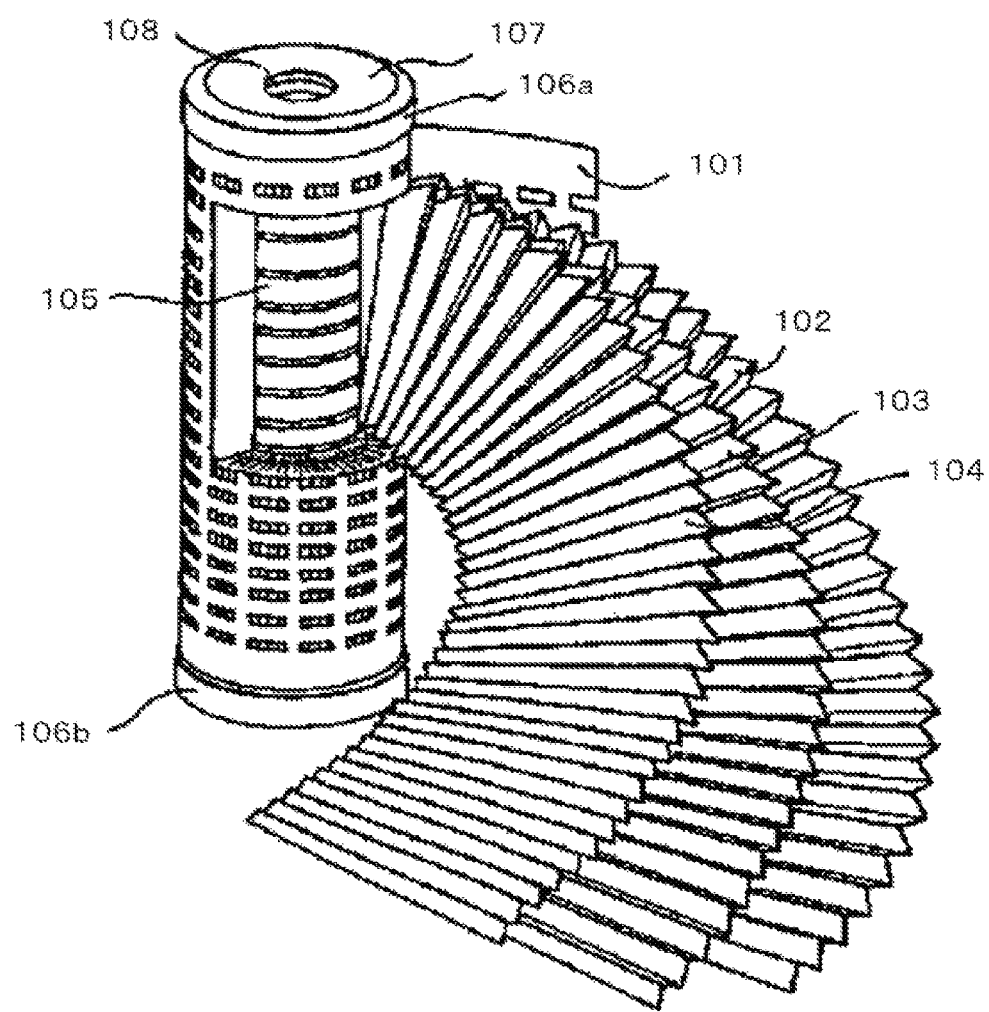
FIG. 1 is a view illustrating the structure of an ordinary pleated filter element before mounted in a housing.

DETAILED DESCRIPTION OF THE INVENTION (Crystalline Polymer Microporous Membrane and Method for Producing Crystalline Polymer Microporous Membrane)

A crystalline polymer microporous membrane of the present invention contains: a crystalline polymer microporous film containing a crystalline polymer; fluorine alcohol covering at least part of an exposed surface of the crystalline polymer microporous film; and a crosslinking agent, wherein the fluorine alcohol is crosslinked with assistance of the crosslinking agent. The crystalline polymer microporous membrane further contains a functional group containing at least one selected from the group consisting of an ion-exchange group, a chelate group, and derivatives thereof, wherein the functional compound is attached to part of at least one of the crosslinking agent and the fluorine alcohol by addition reaction.

In the present invention, the crystalline polymer microporous film before at least part of the exposed surface thereof is covered with the fluorine alcohol crosslinked with assistance of the crosslinking agent is defined as and referred to as "a crystalline polymer microporous film," and the crystalline polymer microporous film after at least part of the exposed surface thereof is covered with the fluorine alcohol crosslinked with assistance of the crosslinking agent is defined as "a crystalline polymer microporous membrane" of the present invention. In addition, note that a first surface and second surface of the crystalline polymer microporous membrane are corresponded to a first and second surface of the crystalline polymer microporous film, respectively, and the crystalline polymer microporous film has a plurality of pores each corresponding to pores of the crystalline polymer microporous membrane.

A method for producing a crystalline polymer microporous membrane of the present invention contains at least a crosslinking step and an addition reaction step, and further contains an asymmetric heating step, a drawing step, and a crystalline polymer film forming step, and may further contain and other steps, if necessary.

The crystalline polymer microporous membrane and the method for producing the same of the present invention will be specifically explained hereinafter.

A method for producing a crystalline polymer microporous membrane, including: applying at least fluorine alcohol and a crosslinking agent to an exposed surface of a crystalline polymer microporous film; and crosslinking the fluorine alcohol with assistance of the crosslinking agent, wherein the crystalline polymer microporous film has an asymmetric pore structure. It is preferred that the method further includes allowing a functional compound containing at least one of an ion-exchange group and a chelate group to initiate an addition reaction with part of at least one of the crosslinking agent and the fluorine alcohol.

The crystalline polymer microporous membrane is preferably obtained by heating one surface of a film formed of a crystalline polymer to form a semi-baked film with a temperature gradient in the thickness direction thereof, drawing the semi-baked film. In this case, it is preferred that heating be performed from the side of "the second surface" having the smaller average pore diameter than that on "first surface." The pore is a continuous pore (i.e. a pore both ends of which are open) from the first surface to the second surface.

The "first surface" having the larger average pore diameter may be referred to as "unheated surface," and "the second surface" having the smaller average pore diameter may be referred to as "the heated surface" in the descriptions below for simplicity of explanation. However, semi-baking may be performed on either surface of an unbaked crystalline polymer film, and thus either surface thereof may become "the heated surface."

—Crystalline Polymer—

In the present specification, the term "crystalline polymer" means a polymer having a molecular structure in which crystalline regions containing regularly-aligned long-chain molecules are mixed with amorphous regions having not regularly aligned long-chain molecules. Such polymer exhibits crystallinity through a physical treatment. For example, if a polyethylene film is drawn by an external force, a phenomenon is observed in which the initially transparent film turns to the clouded film in white. This phenomenon is derived from the expression of crystallinity which is obtained when the molecular alignment in the polymer is aligned in one direction by the external force.

The crystalline polymer is suitably selected depending on the intended purpose without any restriction. Examples thereof include polyalkylenes, polyesters, polyamides, polyethers, and liquid crystalline polymers. Specific examples thereof include polytetrafluoroethylene, polyvinylidene fluoride, a tetrafluoroethylene-perfluoroalkylvinyl ether copolymer, a tetrafluoroethylene-hexafluoropropylene copolymer, a tetrafluoroethylene-ethylene copolymer, polychlorotrifluoroethylene, a chlorotrifluoroethylene-ethylene copolymer, polyethylene, polypropylene, nylon, polyacetal, polybutylene terephthalate, polyethylene terephthalate, syndiotactic polystyrene, polyphenylene sulfide, polyether ether ketone, wholly aromatic polyamide, wholly aromatic polyester, fluororesin, and polyethernitrile. These may be used independently or in combination.

Among them, polyalkylene (e.g. polyethylene and polypropylene) is preferable, fluoropolyalkylenes in which a hydrogen atom of the alkylene group in polyalkylene is partially or wholly substituted with a fluorine atom are more preferable, and polytetrafluoroethylenes (PTFE) are particularly preferable, as they have desirable chemical resistance and handling properties.

Polyethylenes vary in their densities depending on the branching degrees thereof and are classified into low-density polyethylenes (LDPE) that have high branching degrees and are low in crystallinity, and high-density polyethylenes (HDPE) that have low branching degrees and are high in crystallinity. Both LDPE and HDPE can be used. Among these, HDPE is particularly preferable in terms of the crystallinity control.

The crystalline polymer preferably has a glass transition temperature of 40° C. to 400° C., more preferably 50° C. to 350° C. The crystalline polymer preferably has a mass average molecular weight of 1,000 to 100,000,000. The crystalline polymer preferably has a number average molecular weight of 500 to 50,000,000, more preferably 1,000 to 10,000,000.

The crystalline polymer microporous membrane has a plurality of pores, where the average pore diameter of a first surface of the crystalline polymer microporous membrane is larger than that of a second surface thereof, and the average pore diameter of the crystalline polymer microporous membrane continuously changes from the first surface thereof to the second surface thereof. That is, the average pore diameter at the unheated surface (the first surface) of the membrane is larger than the average pore diameter at the heated surface (the second surface) of the membrane.

When the membrane is assumed to have a thickness of 10, an average pore diameter is P1 at a depth of 1 from the surface, an average pore diameter is P2 at a depth of 9 from the surface, and the ratio P1/P2 is preferably 2 to 10,000, more preferably 3 to 100.

In addition, the crystalline polymer microporous membrane has a ratio (an average pore diameter at the unheated surface/an average pore diameter at the heated surface) of 5/1 to 30/1, more preferably 10/1 to 25/1, and even more preferably 15/1 to 20/1.

The average pore diameter of the unheated surface (first surface) of the crystalline polymer microporous membrane is suitably selected depending on the intended purpose without any restriction, but it is preferably 0.1 μm to 500 μm, more preferably 0.25 μm to 250 μm, and particularly more preferably 0.50 μm to 100 μm.

When the average pore diameter is smaller than 0.1 μm, the flow rate may be reduced. When the average pore diameter is larger than 500 μm, fine particles may not be efficiently captured. On the other hand, the average pore diameter within the above-described particularly preferable range is advantageous for the flow rate and capturing ability of fine particles.

The average pore diameter of the heated surface (second surface) of the crystalline polymer microporous membrane is suitably selected depending on the intended purpose without any restriction, but it is preferably 0.01 μm to 5.0 μm, more preferably 0.025 μm to 2.5 μm, and particularly more preferably 0.05 μm to 1.0 μm.

When the average pore diameter is smaller than 0.01 μm, the flow rate may be reduced. When the average pore diameter is larger than 5.0 μm, fine particles may not be efficiently captured. On the other hand, the average pore diameter within the above-described particularly preferable range is advantageous for the flow rate and capturing ability of fine particles.

The average pore diameter is, for example, measured as follows: a surface of the membrane is photographed (SEM photograph with a magnification of ×1,000 to ×5,000) using a scanning electron microscope (HITACHI S-4000, and HITACHI E1030 (for vapor deposition), both manufactured by Hitachi, Ltd.), the photograph is taken into an image processing apparatus (Name of main body: TV IMAGE PROCESSOR TVIP-4100II, manufactured by Nippon Avionics Co., Ltd., Name of control software: TV IMAGE PROCESSOR IMAGE COMMAND 4198, manufactured by Ratoc System Engineering Co., Ltd.) so as to obtain an image only including crystalline polymer fibers, a certain number of pores on the image were measured in terms of the diameter thereof, and the average pore diameter is calculated by arithmetically processing the measured pores.

The crystalline polymer microporous membrane of the present invention includes both an (first) aspect in which the average pore diameter continuously changes from the unheated surface (the first surface) thereof towards the heated surface (the second surface) thereof, and an (second) aspect in which the membrane has a single-layer structure. Addition of these aspects makes it possible to lengthen the filtration lifetime effectively.

The phrase "the average pore diameter continuously changes from the unheated surface thereof towards the heated surface thereof" used in the first aspect means that when the distance (t) from the unheated surface in the thickness direction (which is equivalent to the depth from the first surface) is plotted on the horizontal axis on a graph, and the average pore diameter (D) is plotted on the vertical axis on the graph, the graph is represented by one continuous line. The graph concerning the area between the unheated surface (t=0) and the heated surface (t=membrane thickness) may be composed only of regions where the inclination is negative (dD/dt<0), or may be composed of regions where the inclination is negative and regions where the inclination is zero (dD/dt=0), or may be composed of regions where the inclination is negative and regions where the inclination is positive (dD/dt>0). It is desirable that the graph be composed only of regions where the inclination is negative (dD/dt<0), or composed of regions where the inclination is negative and regions where the inclination is zero (dD/dt=0). It is particularly desirable that the graph be composed only of regions where the inclination is negative (dD/dt<0).

The regions where the inclination is negative preferably include at least the unheated surface of the membrane. In the regions where the inclination is negative (dD/dt<0), the inclination may be constant or vary. For instance, when the graph concerning the crystalline polymer microporous membrane of the present invention is composed only of regions where the inclination is negative (dD/dt<0), it is possible to employ an aspect in which dD/dt at the heated surface of the membrane is greater than dD/dt at the unheated surface of the membrane. Also, it is possible to employ an aspect in which dD/dt gradually increases from the unheated surface of the membrane towards the heated surface of the membrane (an aspect in which the absolute value thereof decreases).

The term "single-layer structure" used in the second aspect excludes multilayer structures which are each formed, for example, by sticking together or depositing two or more layers. In other words, the term "single-layer structure" used in the second aspect means a structure having no border between layers that exists in a multilayer structure. In the second aspect, it is preferred that the membrane have a plane, where the average pore diameter is smaller than that at the unheated surface and larger than that at the heated surface, inside the membrane.

The crystalline polymer microporous membrane of the present invention preferably includes both the characteristics of the first and second aspects. Specifically, the microporous membrane is preferably such that the average pore diameter at the unheated surface of the membrane is larger than the average pore diameter at the heated surface of the membrane, the average pore diameter continuously changes from the unheated surface towards the heated surface, and the membrane has a single-layer structure. Configuration in such a manner makes it possible for the microporous membrane to trap fine particles highly efficiently when a solution or the like is passed for filtration from the side of the surface with the larger average pore diameter, enables its filtration lifetime to lengthen greatly and can be produced easily at low cost.

A thickness of the crystalline polymer microporous membrane is preferably 1 μm to 300 μm, more preferably 5 μm to 100 μm, and even more preferably 10 μm to 80 μm.

In the present invention, at least part of the exposed surface of the crystalline polymer microporous film is covered with fluorine alcohol which is crosslinked with assistance of a crosslinking agent. At least part of the exposed surface of the crystalline polymer microporous film may be covered with a functional compound, which is a hydrophilic composition.

The term "exposed surface" used here includes the exposed surfaces of the crystalline polymer microporous film and surroundings of the pores, and inner portions of the pores.

<Fluorine Alcohol>

The fluorine alcohol is a fluorine compound having a hydroxyl group in a molecular structure thereof.

Examples thereof include A-1420, A-1620, A-7412, A-7612 (manufactured by DAIKIN INDUSTRIES, LTD.), 2,2,3,3-tetrafluoro-1,4-butandiol or derivatives thereof. Among them, the fluorine alcohol having two or more hydroxyl groups per molecule is particularly preferable, in terms of improvement of durability. These may be used independently, or in combination.

The amount of the fluorine alcohol is preferably 0.01% by mass to 20% by mass, more preferably 0.02% by mass to 17.5% by mass, and particularly preferably 0.03% by mass to 15% by mass. When the amount is less than 0.01% by mass, hydrophilization may not be achieved. When the amount is more than 20% by mass, pores of the crystalline polymer microporous film may be blocked with the fluorine resin, which may decrease the filtration flow rate of the crystalline polymer microporous membrane.

<Crosslinking Agent>

The crosslinking agent is suitably selected depending on the intended purpose without any restriction. Examples thereof include epoxy compounds, cyclic ether compounds such as oxetane compounds; reactive group-containing compounds such as amino group-containing compounds; leaving group-containing compounds such as compounds having halogenated terminal groups, compounds having tosylated terminal groups. These may be used independently, or in combination.

Among them, polyfunctional epoxy compounds having two or more functional groups per molecule are particularly preferable, because of high reactivity and high crosslink density.

—Epoxy Compound—

As the epoxy compound, any of an aliphatic epoxy compound and an alicyclic epoxy compound can be used.

The aliphatic epoxy compound is suitably selected depending on the intended purpose without any restriction. Examples thereof include aliphatic polyhydric alcohol and polyglycidyl ether of alkylene oxide adduct thereof. Specific examples thereof include ethylene glycol diglycidyl ether, diethylene glycol diglycidyl ether, propylene glycol diglycidyl ether, tripropylene glycol diglycidyl ether, neopentyl glycol diglycidyl ether, 1,4-butanediol diglycidyl ether, 1,6-hexanediol diglycidyl ether, trimethylolpropane triglycidyl ether, trimethylolpropane diglycidyl ether, polyethylene glycol diglycidyl ether, pentaerythritol tetraglycidyl ether, bisphenol A diglycidyl ether, bisphenol AD diglycidyl ether, bisphenol S diglycidyl ether, hydrogenated bisphenol A diglycidyl ether, bisphenol F diglycidyl ether, bisphenol G diglycidyl ether, tetramethyl bisphenol A diglycidyl ether, bisphenol hexafluoroacetone diglycidyl ether, bisphenol C diglycidyl ether, dibromomethylphenyl glycidyl ether, dibromophenyl glycidyl ether, dibromomethylphenyl glycidyl ether, bromophenyl glycidyl ether, dibromometacrecidyl glycidyl ether, dibromoneopentyl glycol diglycidyl ether. These may be used independently, or in combination.

Examples of the commercially available aliphatic epoxy compound include EPOLIGHT 100MF (trimethylolpropane triglycidyl ether) (manufactured by KYOEISHA CHEMICAL CO., LTD.); EX-411, EX-313, EX-614B (manufactured by Nagase ChemiteX Corporation); and EPIOL E400 (manufactured by NOF CORPORATION).

The alicyclic epoxy compound is suitably selected depending on the intended purpose without any restriction. Examples thereof include vinylcyclohexene monoxide, 1,2-epoxy-4-vinylcyclohexane, 1,2:8,9 Diepoxylimonen, and 3,4-epoxycyclohexenylmethyl-3',4'-epoxycyclohexanecarboxylate. These may be used independently, or in combination.

Examples of the commercially available alicyclic epoxy compound include CEL2000, CEL3000, and CEL2021P (manufactured by Daicel Chemical Industries, Ltd.).

—Oxetane Compound—

The oxetane compound is a compound having a four-membered cyclic ether, i.e., oxetane ring, in a molecule thereof.

The oxetane compound is suitably selected depending on the intended purpose without any restriction. Examples thereof include 3-ethyl-3-hydroxymethyl-oxetane, 1,4-bis [(3-ethyl-3-oxetanylmethoxy)methyl]benzene, 3-ethyl-3-(phenoxymethyl)oxetane, bis(3-ethyl-3-oxetanylmethyl) ether, 3-ethyl-3-(2-ethylhexyloxymethyl)oxetane), 3-ethyl-3-[{3-(triethoxysilyl)propoxy}methyl]oxetane, oxetanyl silsesquioxane, phenol novolak oxetane. These may be used independently, or in combination.

The oxetanyl silsesquioxane is a silane compound having an oxetanyl group. For example, it is a polysiloxane compound which has a network structure including a plurality of oxetanyl groups, and is obtained by hydrolysis condensation of 3-ethyl-3-[{3-(triethoxysilyl)propoxy}methyl]oxetane.

Examples of the commercially available oxetane compound include OXT-101 (3-ethyl-3-hydroxymethyl oxetane), OXT-211 (3-ethyl-3-(phenoxymethyl)oxetane), OXT-221 (di [1-ethyl(3-oxetanyl)]methyl ether), OXT-212 (3-ethyl-3-(2-ethylhexyloxymethyl)oxetane), which are products of TOAGOSEI CO., LTD.

—Amino Group-Containing Compound—

The amino group-containing compound is suitably selected depending on the intended purpose without any restriction. Examples thereof include ethylene diamine, pentaethylene hexamine, triethylenetetramine, and polyetheramine such as Jeffamine. These may be used independently, or in combination.

The state of the crystalline polymer microporous membrane such that at least part of the exposed surface of the crystalline polymer microporous film is covered with the fluorine alcohol and the fluorine alcohol is crosslinked with assistance of the crosslinking agent can be confirmed by finely cutting a film before covered with the surfactant and a membrane (film covered with the surfactant), and extracting each of them in a solvent such as methanol, water, and DMF, and measuring and analyzing the extracted substance by NMR, IR, or the like.

In the case where the crystalline polymer microporous membrane cannot be extracted in the solvent, it can be confirmed by finely cutting the membrane, and measuring and analyzing the resultant mixed with KBr by IR, or by decomposing the polymer using supercritical methanol, and measuring and analyzing the resulting components by MASS, NMR, IR, or the like.

The state where the fluorine alcohol is crosslinked with assistance of the crosslinking agent can be confirmed by finely cutting the membrane, and measuring and analyzing the resultant mixed with KBr by IR, or by decomposing the polymer using supercritical methanol, and measuring and analyzing the resulting components by MASS, NMR, IR, or the like.

Since the crystalline polymer microporous membrane contains the crystalline polymer microporous film in which at least part of the exposed surface thereof is covered with the fluorine alcohol, the fluorine alcohol being crosslinked with assistance of the crosslinking agent, the crystalline polymer microporous membrane of the present invention enables to have a characteristic asymmetric pore structure as well as having hydrophilicity, and thus the filtration life time thereof is further improved. This is probably because of a unique asymmetric pore structure of the crystalline polymer microporous membrane, in which the fluorine alcohol is applied thicker at the portion closer to the fine filtering portion of the second surface (the heated surface) than at the portion closer to the coarse filtering part of the first surface (the unheated surface), the average pore diameter is continuously change from the first surface to the second surface, and the degree of the change in the average pore diameter is increased from the first surface to the second surface.

This is clear from the fact that the following relationship is satisfied.

Figure 5A:
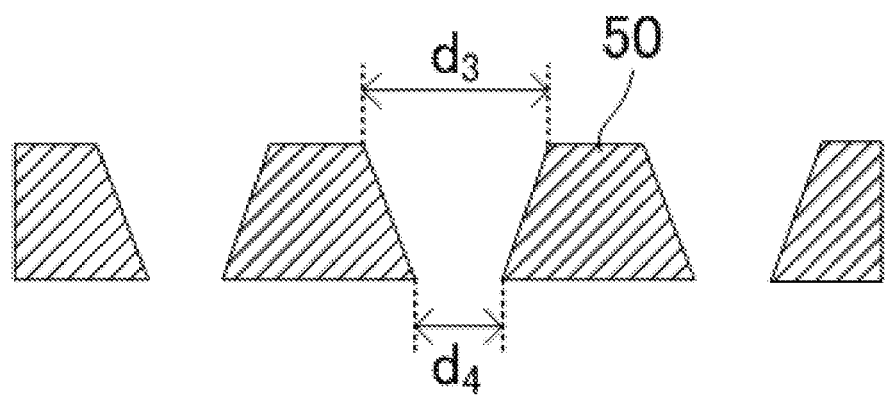
FIG. 5A is a schematic view illustrating a cross-section of the crystalline polymer microporous film having an asymmetric pore structure, before being coated with fluorine alcohol.

As shown in FIG. 5A, the average pore diameter of the first surface of the crystalline microporous polymer film before being covered with the fluorine alcohol which is crosslinked with assistance of the crosslinking agent is defined as $d_3$, the average pore diameter of the second surface of the crystalline polymer microporous film before being covered with the fluorine alcohol is defined as $d_4$, and a ratio of $d_3$ to $d_4$ is expressed by $d_3/d_4$.

Figure 5B:
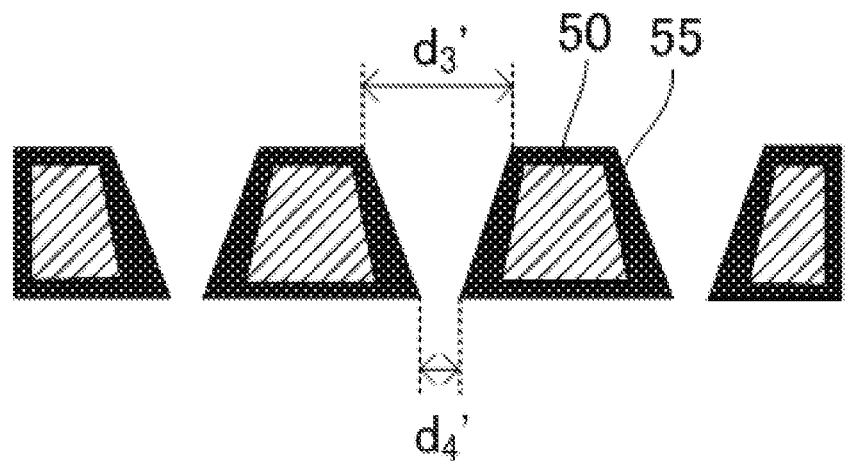
FIG. 5B is a schematic view illustrating a cross-section of the crystalline polymer microporous membrane having an asymmetric pore structure, after being coated with fluorine alcohol.

As shown in FIG. 5B, the average pore diameter of the first surface of the crystalline polymer microporous film after being covered with the fluorine alcohol which is crosslinked with assistance of the crosslinking agent (i.e. the first surface of the crystalline polymer microporous membrane) (after crosslinking) is defined as $d_3'$, the average pore diameter of the second surface of the crystalline polymer microporous film after being covered with the fluorine alcohol (i.e. the second surface of the crystalline polymer microporous membrane) (after crosslinking) is defined as $d_4'$, and a ratio of $d_3'$ to $d_4'$ is expressed by $d_3'/d_4'$. Here, the crystalline polymer microporous membrane preferably satisfies $(d_3'/d_4')/(d_3/d_4)>1$, more preferably $(d_3'/d_4')/(d_3/d_4)>1.005$, and even more preferably $(d_3'/d_4')/(d_3/d_4)>1.01$. When the crystalline polymer microporous membrane does not satisfy $(d_3'/d_4')/(d_3/d_4)>1$, namely the relationship of the aforementioned ratios is $(d_3'/d_4')/(d_3/d_4) \leq 1$, such crystalline polymer microporous membrane has a extremely short filtration lifetime due to clogging or the like.

The coverage rate of the crystalline polymer microporous film with the fluorine alcohol which is crosslinked with assistance of the crosslinking agent is suitably adjusted depending on the surface area of the crystalline polymer microporous film without any restriction, provided that at least part of the exposed surface of the crystalline polymer microporous film is covered with the fluorine alcohol. For example, the method described in JP-A No. 08-283447 can be used. Specifically, the surface area has a correlation with the porosity of the crystalline polymer microporous film, and the coverage rate of the crystalline polymer microporous film with the fluorine alcohol which is crosslinked with assistance of the crosslinking agent can be optimized based on the relationship with the porosity. Concretely, it can be calculated using the following formulae 1 and 2.

The porosity is suitably selected depending on the intended purpose without any restriction, but it is preferably 60% or more, more preferably 60% to 95%. When the porosity is less than 60%, the hydrophilicity of the resulting crystalline polymer microporous membrane is low, and thus the desired flow rate cannot be attained by such crystalline polymer microporous membrane. When the porosity is more than 95%, the physical strength of the resulting crystalline polymer microporous membrane is low.

The lower the porosity of the crystalline polymer microporous film is, the lower the coverage rate of the crystalline polymer microporous film with the fluorine alcohol which is crosslinked with assistance of the crosslinking agent. The higher the porosity is, the higher the coverage rate is. However, any coverage rate is acceptable as long as it is in the range specified by the following formulae 1 and 2.

When the coverage rate is less than the range specified by the following formulae 1 and 2, hydrophilicity of the resulting crystalline polymer microporous membrane is excessively high, and thus long filtration life time thereof may not be attained. When the coverage rate is more than such range, the resulting crystalline polymer microporous membrane may cause clogging.

$$(C/5)-11.5 \leq D \leq (C/5)-9.5 \quad \text{Formula 1}$$

$$D = (\text{applied weight of fluorine alcohol/weight of crystalline polymer microporous membrane}) \times 100 \quad \text{Formula 2}$$

In the formula 1 above, "C" is a porosity (%) of a crystalline polymer microporous film.

The crosslink density of the fluorine alcohol crosslinked with assistance of the crosslinking agent is suitably selected depending on the intended purpose without any restriction, but it is preferably 50% to 95%, more preferably 55% to 92.5%, and particularly preferably 60% to 90%.

When the crosslink density is less than 50%, water resistance of the resulting crystalline polymer microporous membrane may be poor. When the crosslink density is more than 95%, the resulting crystalline polymer microporous membrane may be excessively hard. On the other hand, the crosslink density being within a preferable range is advantageous, in that the resulting crystalline polymer microporous membrane has excellent water resistance, and can maintain suitable strength of the membrane.

The crosslink density can be measured by measurement of the reaction rate of the crosslinking agent, and the reaction rate can be measured by IR, NMR or the like.

In the present invention, with at least one of the fluorine alcohol and the crosslinking agent, the functional compound containing at least one of an ion-exchange group and a chelate group is preferably subjected to addition reaction (addition reaction process).

<Functional Compound>

The functional compound is suitably selected depending on the intended purpose without any restriction, provided that it contains at least one selected from the group consisting of an ion-exchange group, a chelate group, and derivatives thereof, and contains a reactive group which reacts with at least one of the fluorine alcohol and the crosslinking agent.

—Ion-Exchange Group—

The ion-exchange group is a functional group which captures a metal ion and the like by ionic bonding.

The ion-exchange group is suitably selected depending on the intended purpose without any restriction, provided that it is a functional group which bonds to a metal ion with an ionic bond. Examples thereof include cation-exchange groups such as a sulfonic acid group, a phosphoric acid group, a carboxyl group, and anion-exchange groups such as a primary amino group, a secondary amino group, a tertiary amino group, a quaternary amino group, and a quaternary ammonium base.

—Chelate Group—

The chelate group is a functional group which captures a metal ion and the like by chelate (coordinate) bonding.

The chelate group is suitably selected depending on the intended purpose without any restriction, provided that it is a functional group which bonds to a metal ion with a chelate (coordinate) bond. Examples thereof include multidentate ligands such as a nitrilotriacetic acid derivative (NTA) group, an iminodiacetic acid group, an iminodiethanol group, an amino polycarboxylic acid, aminopolyphosphonic acid, a porphyrin skeleton, a phthalocyanine skeleton, cyclic ether, cyclic amine, phenol, a lysine derivative, a phenanthroline group, a terpyridine group, a bipyridine group, a triethylenetetramine group, a diethylenetriamine group, a tris(carboxymethyl)ethylenediamine group, a diethylenetriaminepentaacetic acid group, a polypyrazolyl boric acid group, a 1,4,7-triazacyclononane group, a dimethyl glyoxime group, and a diphenyl glyoxime group.

—Reactive Group with at Least One of Fluorine Alcohol and Crosslinking Agent—

The reactive group which reacts with at least one of the fluorine alcohol and the crosslinking agent is suitably selected depending on the intended purpose without any restriction. Examples thereof include an amino group, a hydroxyl group, an epoxy group, an isocyanate group, a thiol group, a carboxyl group, and derivative groups thereof. An amino group, a hydroxyl group, an epoxy group and derivative groups thereof are preferably used, and an amino group, and a hydroxyl group are more preferably used.

Examples of the compound having a reactive group include hydroxyethyl iminodiacetic acid, nitrilotriacetic acid, hydroxyethylethylenediamine triacetic acid, bishydroxyethyl glycine, amino carboxypenty liminodiacetic acid (manufactured by DOJINDO LABORATORIES), and taurine, hydroxypropylsulfonic acid, phosphorylethanolamine, and choline (manufactured by Tokyo Chemical Industry Co., Ltd.).

The amount of the functional compound is preferably 0.001% by mass to 20% by mass, more preferably 0.002% by mass to 15% by mass, and even more preferably 0.003% by mass to 10% by mass. When the amount is less than 0.001% by mass, ion capturing may not be efficiently performed. When the amount is more than 20% by mass, pores of the crystalline polymer microporous membrane are blocked and the filtration flow rate may decrease.

A solvent may be used if necessary. The solvent used is suitably selected depending on the intended purpose without any restriction. Examples thereof include: water; alcohols such as methanol, ethanol, isopropanol, ethylene glycol; ketones such as acetone, and methyl ethyl ketone; ethers such as tetrahydrofuran, dioxane, propylene glycol monomethyl ether acetate; dimethyl formamide; and dimethyl sulfoxide. These may be used independently or in combination.

Other additives such as an antioxidant and the like can be added, provided that they do not adversely affect the obtainable effect of the present invention.

Examples of the commercial products of the antioxidant include dibutylhydroxytoluene (BHT), IRGANOX 1010, IRGANOX 1035FF, and IRGANOX 565.

—Functional Compound Immobilized in Membrane—

The fluorine alcohol is applied so as to cover a wall of the pore of the crystalline polymer microporous film (film formed of crystalline polymer), and is crosslinked to fix the fluorine alcohol to the wall. Therefore, the functional compound is immobilized in the crystalline polymer microporous membrane in the state of the noncovalent bonding, by allowing the functional compound to cause an addition reaction with at least one of the fluorine alcohol and the crosslinking agent.

The state where the functional compound is immobilized in the crystalline polymer microporous membrane can be confirmed by the back-titration technique described in JP-A No. 2005-131482 or the like.

By immobilizing the functional compound in the membrane, high flow rate can be achieved.

It is said that the flow rate is determined generally from a pore diameter (D), pressure loss (ΔP), number of pores (n), thickness of membrane (L), and liquid viscosity (η), as represented by the following equation. It is predicted that the flow rate may be lowered as the pore diameter thereof is decreased as a result of the immobilization of the functional compound in the membrane. In fact, high flow rate can be achieved. It is estimated that high flow rate is achieved by improvement of the hydrophilicity.

$$Q = \frac{\pi D^4 \Delta P n}{128 L \eta}$$

<Method for Producing Crystalline Polymer Microporous Membrane>

A method for producing a crystalline polymer microporous membrane of the present invention includes at least a crosslinking step, and further includes an addition reaction process step, a crystalline polymer film forming step, an asymmetric heating step, and a drawing step, and may further include other steps, if necessary.

—Crystalline Polymer Film Forming Step—

A starting material used for forming an unbaked crystalline film formed of a crystalline polymer is suitably selected from those crystalline polymers mentioned above without any restriction. Among them, polyethylene, or a crystalline polymer in which hydrogen atoms of polyethylene are replaced with fluorine atoms is suitably used, and polytetrafluoroethylene (PTFE) is particularly preferably used.

The crystalline polymer used as the starting material preferably has a number average molecular weight of 500 to 50,000,000, more preferably 1,000 to 10,000,000.

The crystalline polymer used as the starting material is preferably polyethylene, such as polytetrafluoroethylene. As polytetrafluoroethylene, those produced by emulsification polymerization can be used. Preferably, fine polytetrafluoroethylene powder obtained by coagulating aqueous dispersed elements obtained from the emulsification polymerization is used.

Polytetrafluoroethylene used as the starting material preferably has a number average molecular weight of 2,500,000 to 10,000,000, more preferably 3,000,000 to 8,000,000.

A starting material of polytetrafluoroethylene is suitably selected from those known in the art without any restriction, and can be selected from the commercially available starting materials thereof. Preferable examples of the commercial product thereof include POLYFLON fine powder F104U, manufactured by DAIKIN INDUSTRIES, LTD.

It is preferred that a film be prepared by mixing the starting material of polytetrafluoroethylene and an extrusion aid, subjecting the mixture to paste extrusion and drawing the mixture under pressure. The extrusion aid is preferably a liquid lubricant, and specific examples thereof include solvent naphtha and white oil. A commercially available product may be used as the extrusion aid, for example a hydrocarbon oil such as ISOPAR produced by Esso Sekiyu K. K. The amount of the extrusion aid to be added is preferably in the range of 20 parts by mass to 30 parts by mass relative to 100 parts by mass of the crystalline polymer.

In general, the paste extrusion is preferably carried out at a temperature of 50° C. to 80° C. The shape into which the mixture is extruded is suitably selected depending on the intended purpose without any restriction, but the mixture is preferably extruded into a rod. The extruded matter is subsequently drawn into a film under pressure. The drawing under pressure may, for example, be performed by calendering at a rate of 50 m/min, using a calender roll. The temperature at which the drawing under pressure is performed is generally set at 50° C. to 70° C. Thereafter, the film is preferably heated so as to remove the extrusion aid and thus to form an unbaked crystalline polymer film. The heating temperature at this time is suitably set depending on the crystalline polymer for use, but is preferably 40° C. to 400° C., more preferably 60° C. to 350° C. When polytetrafluoroethylene is used as the crystalline polymer, for example, the heating temperature is preferably 150° C. to 280° C., more preferably 200° C. to 255° C. The heating may be performed, for example, by placing the film in a hot-air drying oven. The thickness of the unbaked crystalline polymer film thus produced may be suitably adjusted depending on the thickness of the crystalline polymer microporous membrane to be produced as a final product, and it is also necessary to adjust the thickness under the consideration of reduction in thickness caused by drawing in a subsequent step.

For the production of the crystalline polymer unheated film, the descriptions in "Polyflon Handbook" (published by DAIKIN INDUSTRIES, LTD., Revised Edition of the year 1983) may be suitably used as a reference, and applied.

—Asymmetric Heating Step—

The asymmetric heating step is heating one surface of a film formed of the crystalline polymer with a temperature gradient in the film thickness direction so as to form a semi-baked film.

Here, the term "semi-baked" means that the crystalline polymer is heated at a temperature equal to or higher than the melting point of the baked crystalline polymer, and equal to or lower than the melting point of the unbaked crystalline polymer plus 15° C.

Moreover, the term "unbaked crystalline polymer" means a crystalline polymer which has not been heated for baking, and the term "the melting point of the crystalline polymer" means a peak temperature on an endothermic curve which is formed when the calorific value of the unbaked crystalline polymer is measured by a differential scanning calorimeter. The melting points of the baked and unbaked crystalline polymers vary depending on the crystalline polymer for use or an average molecular weight thereof, but are preferably 50° C. to 450° C., more preferably 80° C. to 400° C.

The selection of such temperature range is based upon the following. In the case of polytetrafluoroethylene, for example, the melting point of baked polytetrafluoroethylene is approximately 324° C. and the melting point of unbaked polytetrafluoroethylene is approximately 345° C. Accordingly, to produce a semi-baked film from the polytetrafluoroethylene film, the film is preferably heated at a temperature of 327° C. to 360° C., more preferably 335° C. to 350° C., and for example at 345° C. The semi-baked film is in the state where a film having a melting point of approximately 324° C. coexists with a film having a melting point of approximately 345° C.

The semi-baked film is produced by heating the one surface (a heating surface) of the film formed of a crystalline polymer.

This makes it possible to control the heating temperature in an asymmetrical manner in the thickness direction and to produce a crystalline polymer microporous membrane easily.

As for the temperature gradient in the thickness direction of the film, the temperature difference between the heating surface and unheating surface of the film is preferably 30° C. or more, more preferably 50° C. or more.

The method of heating the film is selected from the various methods, such as a method of blowing hot air to the crystalline polymer film, a method of bringing the crystalline polymer film into contact with a heat medium, a method of bringing the crystalline polymer film into contact with a heated member, a method of irradiating the crystalline polymer film with an infrared ray and a method of irradiating the crystalline polymer film with an electromagnetic wave.

Although the method of heating the film can be selected without any restriction, the method of bringing the crystalline polymer film into contact with a heated member and the method of irradiating the crystalline polymer film with an infrared ray are particularly preferable. As the heated member, a heating roller is particularly preferable. Use of the heating roller makes it possible to continuously perform semi-baking in an assembly-line operation in an industrial manner and makes it easier to control the temperature and maintain the apparatus. The temperature of the heating roller can be set at the temperature for performing the semi-baking. The duration for the contact between the heating roller and the film may be long enough to sufficiently perform the intended semi-baking, and is preferably 30 seconds to 120 seconds, more preferably 45 seconds to 90 seconds, and even more preferably 60 seconds to 80 seconds.

The method of the infrared ray irradiation is suitably selected from those known in the art without any restriction.

For the general definition of the infrared ray, "Infrared Ray in Practical Use" (published by Ningentorekishisha in 1992) may be referred to. Here, the infrared ray means an electromagnetic wave having a wavelength of 0.74 μm to 1,000 μm. Within this range, an electromagnetic wave having a wavelength of 0.74 μm to 3 μm is defined as a near-infrared ray, and an electromagnetic wave having a wavelength of 3 μm to 1,000 μm is defined as a far-infrared ray.

Since the temperature difference between the unheated surface and the heated surface of the semi-baked film is preferably large, it is desirable to use a far-infrared ray that is advantageous for heating a surface layer.

A device for applying the infrared ray is suitably selected depending on the intended purpose without any restriction, provided that it can apply an infrared ray having a desired wavelength. Generally, an electric bulb (halogen lamp) is used as a device for applying the near-infrared ray, while a heating element such as a metal oxidized surface, quartz or ceramic is used as a device for applying the far-infrared ray.

Also, infrared irradiation enables the film to be continuously semi-baked in an assembly-line operation in an industrial manner and makes it easier to control the temperature and maintain the device. Moreover, since the infrared irradiation is performed in a noncontact manner, it is clean and does not allow defects such as pilling to arise.

The temperature of the film surface when irradiated with the infrared ray can be controlled by the output of the infrared irradiation device, the distance between the infrared irradiation device and the film surface, the irradiation time (conveyance speed) and/or the atmospheric temperature, and may be adjusted to the temperature at which the film is semi-baked. The temperature of the film surface is preferably 327° C. to 380° C., more preferably 335° C. to 360° C. When the temperature is lower than 327° C., the crystallized state may not change and thus the pore diameter may not be able to be controlled. When the temperature is higher than 380° C., the entire film may melt, thus possibly causing extreme deformation or thermal decomposition of the polymer.

The duration for the infrared irradiation is suitably adjusted depending on the intended purpose without any restriction, but is long enough to perform sufficient semi-baking, preferably 30 seconds to 120 seconds, more preferably 45 seconds to 90 seconds, and even more preferably 60 seconds to 80 seconds.

The heating in the asymmetric heating step may be carried out continuously or intermittently.

In the case where the second surface of the film is continuously heated, it is preferable to simultaneously perform heating of the second surface and cooling of the first surface of the film to maintain the temperature gradient of the film between the first surface and second surface.

The method of cooling the first surface (unheated surface) is suitably selected depending on the intended purpose without any restriction. Examples thereof include a method of blowing cold air, a method of bringing the unheated surface into contact with a cooling medium, a method of bringing the unheated surface into contact with a cooled material and a method of cooling the unheated surface by cooling in air. It is preferred that the cooling be performed by bringing the unheated surface into contact with the cooled material. A cooling roller is particularly preferable as the cooled material. Use of the cooling roller makes it possible to continuously perform semi-baking in an assembly-line operation in an industrial manner similarly to heating the heating surface and makes it easier to control the temperature and maintain the apparatus. The temperature of the cooling roller can be set so as to generate a difference to the temperature for performing the semi-baking. The duration for the contact between the cooling roller and the film may be long enough to sufficiently perform the intended semi-baking, and considering the fact that it is performed at the same time as heating, is generally 30 seconds to 120 seconds, preferably 45 seconds to 90 seconds, and even more preferably 60 seconds to 80 seconds.

The surface material of the heating roller and cooling roller is generally stainless steel that is excellent in durability, particularly preferably SUS316. In the method for producing a crystalline polymer microporous membrane, it is also a preferable embodiment that the unheated surface of the film is brought into contact with a heating and cooling roller. Also, the heated surface of the film may be brought into contact with a roller having the temperature lower than the heating and cooling roller. For example, a roller maintaining ambient temperature may be brought into contact with and press the film from the heating surface of the film so as to make the film closely fit to the heating roller. Moreover, the heated surface of the film may be brought into contact with a guide roller before or after the contact with the heating roller.

Meanwhile, in the case where the heating in the asymmetric heating step is carried out intermittently, it is preferable to heat the second surface intermittently or cool the first surface of the film so as to restrain increase in the temperature of the first surface.

—Drawing Step—

The semi-baked film is preferably drawn after the semi-baking. The drawing is preferably performed in the both the length direction and width direction. The film may be drawn in the length direction, followed by drawn in the width direction, or may be drawn in the biaxial direction at the same time.

In the case where the film is sequentially drawn in the length direction and width direction, it is preferred that the film be drawn in the length direction first, then be drawn in the width direction.

The extension rate of the film in the length direction is preferably 4 times to 100 times, more preferably 8 times to 90 times, and even more preferably 10 times to 80 times. The temperature for the drawing in the length direction is preferably 100° C. to 300° C., more preferably 200° C. to 290° C., and even more preferably 250° C. to 280° C.

The extension rate of the film in the width direction is preferably 10 times to 100 times, more preferably 12 times to 90 times, even more preferably 15 times to 70 times, and particularly preferably 20 times to 40 times. The temperature for the drawing in the width direction is preferably 100° C. to 300° C., more preferably 200° C. to 290° C., and even more preferably 250° C. to 280° C.

The extension rate of the film in terms of the area thereof is preferably 50 times to 300 times, more preferably 75 times 280 times, and even more preferably 100 times to 260 times. Before the drawing is performed on the film, the film may be pre-heated at the temperature equal to or lower than the temperature for the drawing.

Heat curing may be performed, if necessary, after the drawing. The temperature for the heat curing is generally equal to or higher than the temperature for the drawing, but is lower than the melting point of the baked crystalline polymer.

—Crosslinking Step—

The crosslinking step is applying at least fluorine alcohol and a crosslinking agent to an exposed surface of a film, and crosslinking the fluorine alcohol with assistance of the crosslinking agent.

The method for applying the fluorine alcohol and the crosslinking agent in this step is suitably selected depending on the intended purpose without any restriction. Examples thereof include a method in which the film is immersed in a mixture solution containing at least the fluorine alcohol and the crosslinking agent, and a method in which the film is coated with the mixture solution containing at least the fluorine alcohol and the crosslinking agent.

The method for producing a crystalline polymer microporous membrane including the crosslinking step can perform hydrophilization without performing radiation of UV laser beam or ArF laser beam, or chemical etching, can efficiently produce a hydrophilic crystalline polymer microporous membrane, and can produce a crystalline polymer microporous membrane having excellent hydrophilicity, filtration rate, and life time as a filtration filter.

Next, a mixture solution containing at least the fluorine alcohol and the crosslinking agent is applied (by immersion or coating) to a film, and then the film is subjected to heating (annealing), to thereby crosslink the fluorine alcohol with assistance of the crosslinking agent.

The temperature for the heating is preferably 50° C. to 200° C., more preferably 50° C. to 180° C., and particularly preferably 50° C. to 160° C.

The duration for the heating is preferably 1 minute to 120 minutes, more preferably 1 minute to 100 minutes, and even more preferably 1 minute to 80 minutes.

—Addition Reaction Process Step—

The addition reaction process step is allowing a functional compound containing at least one of the ion-exchange group and the chelate group to initiate an addition reaction with part of at least one of the crosslinking agent and the fluorine alcohol.

A method for initiating an addition reaction of the functional compound to the part of at least one of the crosslinking agent and the fluorine alcohol is suitably selected depending on the intended purpose without any restriction. Examples thereof include (i) a method in which a film (porous membrane) is immersed in a mixture solution containing at least the crosslinking agent, the fluorine alcohol and the functional compound, and subjected to heating (annealing) to thereby crosslink the fluorine alcohol and to occur an addition reaction of the functional compound with the part of at least one of the crosslinking agent and the fluorine alcohol; (ii) a method in which a film (porous membrane) is immersed in a mixture solution containing at least the fluorine alcohol and the functional compound, subjected to heating (annealing) to thereby occur an addition reaction between the part of the fluorine alcohol and the functional compound, followed by immersing in a crosslinking solution, and being subjected to heating (annealing) to thereby crosslink the fluorine alcohol (addition reaction followed by crosslinking reaction); and (iii) a method in which a film (porous membrane) is immersed in a mixture solution containing at least the crosslinking agent and the fluorine alcohol, and subjected to heating (annealing) to thereby crosslink the fluorine alcohol, followed by immersing in a solution containing the functional compound, and being subjected to heating (annealing) to thereby occur an addition reaction of the functional compound with the part of at least one of the crosslinking agent and the fluorine alcohol (crosslinking reaction followed by addition reaction).

The temperature for the heating is preferably 50° C. to 200° C., more preferably 50° C. to 180° C., and particularly preferably 50° C. to 160° C.

The duration for the heating is preferably 0.5 minutes to 300 minutes, more preferably 0.75 minutes to 200 minutes, and even more preferably 1 minute to 100 minutes.

The crystalline polymer microporous membrane of the present invention can be applied for various uses without any restriction, but is particularly preferably used as a filtration filter, which will be explained hereinafter.

(Filtration Filter)

A filtration filter contains the aforementioned crystalline polymer microporous membrane.

When the crystalline polymer microporous membrane is used for a filtration filter, filtration is carried out with the unheated surface (i.e., the surface having the larger average pore diameter) facing the inlet side. In other words, the surface having the large pore size is used as the filtration surface of the filter. By carrying out filtration using the surface having the larger average pore diameter (i.e. the unheated surface) for the inlet side, it is possible to efficiently trap fine particles.

Also, since the crystalline polymer microporous membrane of the present invention has a large specific surface area, fine particles introduced from its front surface can be removed by adsorption and/or adhesion before reaching a portion with the smallest pore diameter. Therefore, the filter hardly allows clogging to arise and can sustain high filtration efficiency for a long period of time.

The filter is capable of filtration at least at a rate of 5 mL/cm$^2$·min or higher, when the filtration is carried out at a differential pressure of 0.1 kg/cm$^2$.

Examples of the form of the filter include a pleated form in which a filtration membrane is corrugated, a spiral form in which a filtration membrane is continuously wound, a frame and plate form in which disc-shaped filtration membranes are stacked on top of one another, and a tube form in which a filtration membrane is formed as a tube. Among these, a pleated form is particularly preferable in that the effective surface area used for filtration per cartridge can be increased.

Filter cartridges are classified into element exchange type filter cartridges in which only filter elements are replaced when filtration membranes having been degraded need to be replaced, and capsule-type filter cartridges in which filter elements are provided integrally with filtration housings and both the filter elements and the housings are used in a disposable manner.

FIG. 1 is a developed view showing the structure of an element exchange type pleated filter cartridge element. Sandwiched between two membrane supports 102 and 104, a microfiltration membrane 103 is corrugated and wound around a core 105 having multiple liquid-collecting slots, and a cylindrical object is thus formed. An outer circumferential cover 101 is provided outside the foregoing members so as to protect the microfiltration membrane. At both ends of the cylindrical object, the microfiltration membrane is sealed with end plates 106a and 106b. The end plates are connected to a sealing portion of a filter housing (not shown), with a gasket 107 placed in between. A filtered liquid is collected through the liquid-collecting slots of the core and discharged from a fluid outlet 108.

Figure 2:
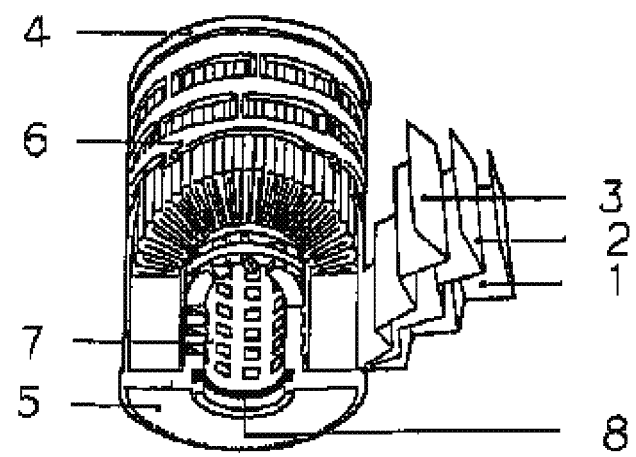
FIG. 2 is a view illustrating the structure of an ordinary filter element before mounted in a housing of a capsule-type filter cartridge.
Figure 3:
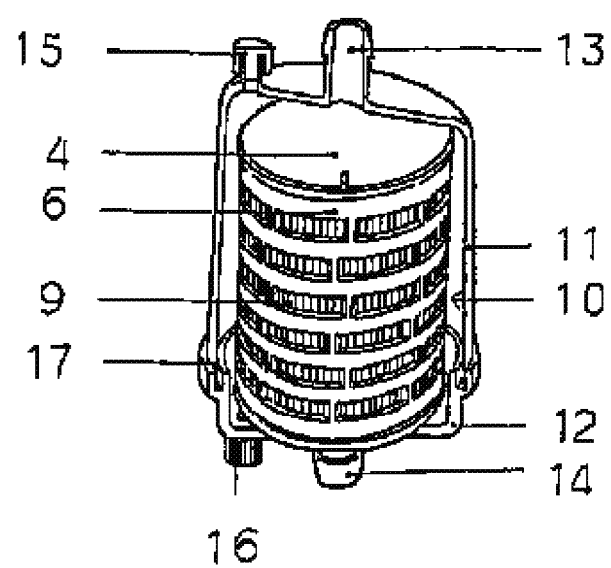
FIG. 3 is a view illustrating a structure of an ordinary capsule-type filter cartridge formed integrally with a housing.

Capsule-type pleated filter cartridges are shown in FIGS. 2 and 3.

FIG. 2 is a developed view showing the overall structure of a microfiltration membrane filter element before installed in a housing of a capsule-type filter cartridge. Sandwiched between two supports 1 and 3, a microfiltration membrane 2 is corrugated and wound around a filter element core 7 having multiple liquid-collecting slots, and a cylindrical object is thus formed. A filter element cover 6 is provided outside the foregoing members so as to protect the microfiltration membrane. At both ends of the cylindrical object, the microfiltration membrane 2 is sealed with an upper end plate 4 and a lower end plate 5.

FIG. 3 shows the structure of a capsule-type pleated filter cartridge in which the filter element 10 has been installed in a housing so as to form a single unit. A filter element 10 is installed in a housing composed of a housing base 12 and a housing cover 11. The lower end plate is connected in a sealed manner to a water-collecting tube (not shown) at the center of the housing base 12 by means of an O-shaped ring 8. An air vent 15 is provided at the upper portion of the housing, and a drain 16 is provided at the bottom portion of the housing. A liquid enters the housing from a liquid inlet nozzle 13 and passes through a filter medium 9, then the liquid is collected through the liquid-collecting slots of the filter element core 7 and discharged from a liquid outlet nozzle 14. In general, the housing base 12 and the housing cover 11 are thermally fused in a liquid-tight manner at a fusing portion 17.

FIG. 2 shows an instance where the lower end plate 5 and the housing base 12 are connected in a sealed manner by means of the O-shaped ring 8. It should be noted that the lower end plate 5 and the housing base 12 may be connected in a sealed manner by thermal fusing or with an adhesive. Also, the housing base 12 and the housing cover 11 may be connected in a sealed manner with an adhesive as well as by thermal fusing. FIGS. 1 to 3 show specific examples of microfiltration filter cartridges, and note that the present invention is not confined to the examples shown in these drawings.

Having a high filtering function and long lifetime as described above, the filter using the crystalline polymer microporous membrane of the present invention enables a filtration device to be compact. In a conventional filtration device, multiple filtration units are used in parallel so as to offset the short filtration life; use of the filter of the present invention for filtration makes it possible to greatly reduce the number of filtration units used in parallel. Furthermore, since it is possible to greatly lengthen the period of time for which the filter can be used without replacement, it is possible to cut costs and time necessary for maintenance.

The filtration filter of the present invention can be used in a variety of situations where filtration is required, notably in microfiltration of gases, liquids, etc. For instance, the filter can be used for filtration of corrosive gases and gases for use in the semiconductor industry, and filtration and sterilization of cleaning water for use in the electronics industry, water for medical uses, water for pharmaceutical production processes and water for foods and drinks. It should be particularly noted that since the filtration filter of the present invention is superior in heat resistance and chemical resistance, the filtration filter can be effectively used for high-temperature filtration and filtration of reactive chemicals, for which conventional filters cannot be suitably used.

EXAMPLES

Examples of the present invention will be explained hereinafter, but these examples shall not be construed as limiting the scope of the present invention.

Example 1

Production of Crystalline Polymer Microporous Membrane 1

—Preparation of Semi-Baked Film—

To 100 parts by mass of polytetrafluoroethylene fine powder having a number average molecular weight of 6,200,000 (POLYFLON fine powder F104U, manufactured by DAIKIN INDUSTRIES, LTD), 27 parts by mass of hydrocarbon oil (ISOPAR manufactured by Esso Sekiyu K. K.) was added as an extrusion aid, and the obtained paste was extruded in the shape of a rod. The extruded paste was subjected to calendering at the speed of 50 m/min. by a calender roller heated at 70° C. to thereby prepare a polytetrafluoroethylene film. This film was then placed in a hot air drying oven having the temperature of 250° C. to dry and remove the extrusion aid, to thereby prepare an unbaked polytetrafluoroethylene film having an average thickness of 100 μm, average width of 150 mm, and specific gravity of 1.55.

A surface (a heating surface) of the obtained unbaked polytetrafluoroethylene film was heated by a roller (surface material: SUS316) heated at 345° C. for 1 minute, to thereby prepare a semi-baked film.

The obtained semi-baked film was then drawn in the length direction by 12.5 times at the temperature of 270° C., then the drawn film was wound up with a winding roller. Thereafter, the film was pre-heated at 305° C., following by being drawn in the width direction by 30 times at the temperature of 270° C. with both ends thereof be pinched by clips. The drawn film was then heat set at 380° C. The extension rate of the drawn film was 260 times in terms of the area.

—Functionalization Process—

In a methanol solution containing 5% by mass of A-7612 (manufactured by DAIKIN INDUSTRIES, LTD.) as fluorine alcohol and 1% by mass of an epoxy compound (product name: DENACOL EX411, manufactured by Nagase ChemiteX Corporation) as a crosslinking agent, and 1% by mass of DBU (1,8-diazabicyclo[5.4.0]undec-7-ene) (manufactured by Wako Pure Chemical Industries, Ltd.) as an accelerator, the drawn film was immersed for 10 minutes, and then the drawn film was taken out from the solution and subjected to annealing for 10 minutes at 150° C. in atmospheric air. Thereafter, the processed film was immersed in methanol for 30 minutes to carry out washing, and then dried, to thereby prepare a crystalline polymer microporous membrane 1.

Example 2

Production of Crystalline Polymer Microporous Membrane 2

A crystalline polymer microporous membrane 2 of Example 2 was obtained in the same manner as in Example 1, except that the functionalization process in Example 1 was changed as follows.

—Functionalization Process—

In a methanol solution containing 5% by mass of A-7612 (manufactured by DAIKIN INDUSTRIES, LTD.) as the fluorine alcohol and 1% by mass of an epoxy compound (product name: DENACOL EX411, manufactured by Nagase ChemiteX Corporation) as the crosslinking agent, 2.5% by mass of a chelate group-containing functional compound (hydroxyethylenediamine triacetic acid, manufactured by DOJINDO LABORATORIES) as the functional compound, and 1% by mass of DBU (manufactured by Wako Pure Chemical Industries, Ltd.) as the accelerator, the drawn film was immersed for 10 minutes, and then the drawn film was taken out from the solution and subjected to annealing for 10 minutes at 150° C. in atmospheric air. Thereafter, the processed film was immersed in a methanol solution for 30 minutes to carry out washing, and then dried, to thereby prepare a crystalline polymer microporous membrane 2.

Example 3

Production of Crystalline Polymer Microporous Membrane 3

A crystalline polymer microporous membrane 3 of Example 3 was obtained in the same manner as in Example 2, except that the chelate group-containing functional compound of Example 2 was replaced with the ion-exchange group-containing functional compound (3-hydroxypropanesulfonic acid manufactured by TOKYO CHEMICAL INDUSTRY CO., LTD.) having a hydroxyl group as a reactive group.

Example 4

Production of Crystalline Polymer Microporous Membrane 4

A crystalline polymer microporous membrane 4 of Example 4 was obtained in the same manner as in Example 2, except that the chelate group-containing functional compound of Example 2 was replaced with the chelate group-containing functional compound (carboxymethyl dextran, manufactured by Meito Sangyo, Co., Ltd.) having a hydroxyl group as the reactive group.

Comparative Example 1

Production of Crystalline Polymer Microporous Membrane 5

A crystalline polymer microporous membrane 5 of Comparative Example 1, which was formed of polytetrafluoroethylene and had an asymmetric pore structure, was produced in the same manner as in Example 1, except that the crosslinking process and addition reaction process were not performed.

Comparative Example 2

Production of Crystalline Polymer Microporous Membrane 6

A crystalline polymer microporous membrane 6 of Comparative Example 2 was produced in the same manner as in Example 1, except that the polytetrafluoroethylene film in Example 1 was replaced with a NAFLON tape (model number: 7-358-01, manufactured by AS ONE Corporation).

Comparative Example 3

Production of Crystalline Polymer Microporous Membrane 7

A crystalline polymer microporous membrane 7 of Comparative Example 3 was produced in the same manner as in Example 2, except that the drawn film in Example 2 was replaced with a polytetrafluoroethylene microporous membrane (symmetric membrane, manufactured by Japan Gore-Tex Inc.).

<Measurement of Average Pore Diameter and Evaluation of Shape of Pores>

The crystalline polymer microporous membranes of Examples 1 to 4 and Comparative Examples 1 to 3 were each cut along the length direction of the membrane. A photograph (a SEM photograph, magnification of 1,000 times to 5,000 times) of the membrane surface, which was the cut surface of the membrane in the thickness direction, was taken by a scanning electron microscope (HITACHI S-4000, HITACHI E-1030 for vapor deposition, both manufactured by Hitachi, Ltd.). The obtained photograph was scanned by an image processor (Device: TV Image Processer TVIP-4100II, manufactured by Nippon Avionics Co., Ltd., Control Software: TV Image Processer Image Command 4198, manufactured by RATOC SYSTEM ENGINEERING CO., LTD.), to thereby obtain an image only consisted of crystalline polymer fibers. Diameters of 100 pores were measured on the obtained image, and were arithmetic processed to determine an average pore diameter.

Shapes of pores on the cut surface of the crystalline polymer microporous membrane in the thickness direction thereof are explained with reference with schematic drawings for more understanding.

Figure 4A:
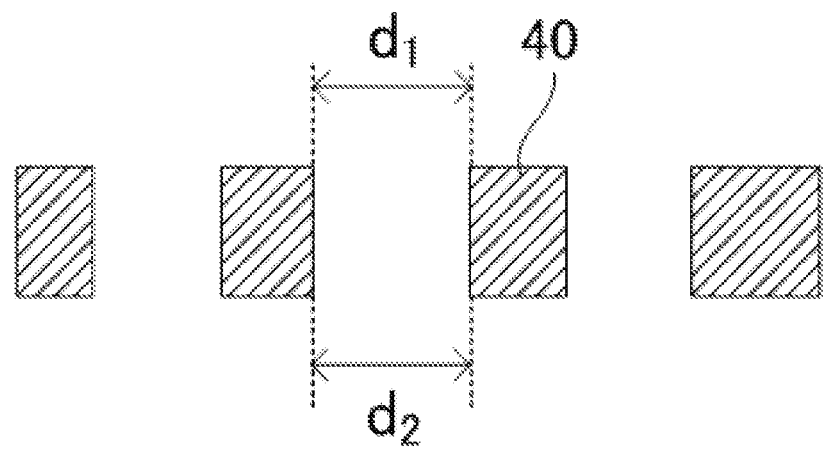
FIG. 4A is a schematic view illustrating a cross-section of the crystalline polymer microporous film having a symmetric pore structure, before being coated with fluorine alcohol.

FIG. 4A is a schematic diagram showing a cut surface of the crystalline polymer microporous film having symmetric pores of Comparative Example 3 before being subjected to the functionalization process (before hydrophilization).

Comparing the average pore diameter $d_1$ on the first surface of the crystalline polymer microporous film having the symmetric pores before being subjected to the functionalization process (before hydrophilization) with the average pore diameter $d_2$ on the second surface thereof in FIG. 4A, the ratio $(d_1/d_2)$ of $d_1$ to $d_2$ on the observed SEM was 1.0.

Figure 4B:
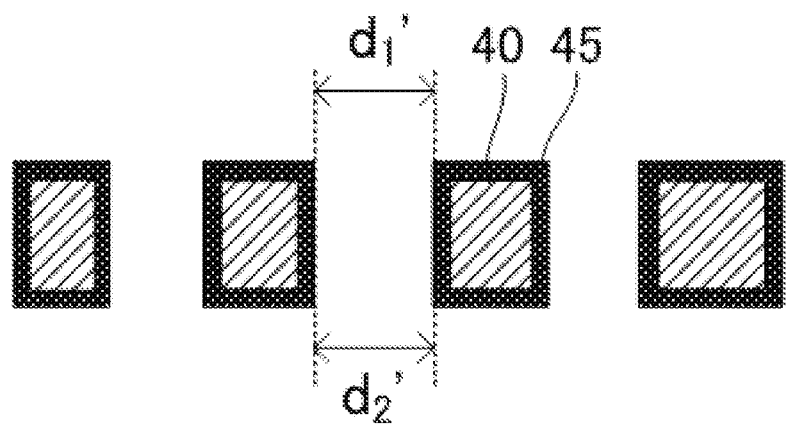
FIG. 4B is a schematic view illustrating a cross-section of the crystalline polymer microporous membrane having a symmetric pore structure, after being coated with fluorine alcohol.

FIG. 4B is a schematic diagram showing a cut surface of the crystalline polymer microporous membrane 40 having symmetric pores and covering portions 45 of Comparative Example 3 after being subjected to the functionalization process (after hydrophilization).

Comparing the average pore diameter $d_1'$ on the first surface of the crystalline polymer microporous membrane having the symmetric pores after being subjected to the functionalization process (after hydrophilization) with the average pore diameter $d_2'$ on the second surface thereof in FIG. 4B, the ratio $(d_1'/d_2')$ of $d_1'$ to $d_2'$ on the observed SEM was 1.0.

In Comparative Example 3, the relationship of $(d_1'/d_2')/(d_1/d_2)$ was 1.0. Based on above, it was found that the crystalline polymer microporous membrane having symmetric pores of Comparative Example 3 which had not been subjected to asymmetric heating did not have any change both in the ratio $(d_1/d_2)$ and the ratio $(d_1'/d_2')$ before and after being subjected to the functionalization process (crosslinking and addition reaction).

FIG. 5A is a schematic diagram showing a cut surface of the crystalline polymer microporous film having asymmetric pores of Example 1 before being subjected to the functionalization process (before hydrophilization).

When the average pore diameter on the first surface of the crystalline polymer microporous film having the asymmetric pores before being subjected to the functionalization process (before hydrophilization) was determined as $d_3$, and the average pore diameter on the second surface thereof was determined as $d_4$ in FIG. 5A, the ratio $(d_3/d_4)$ of $d_3$ to $d_4$ on the observed SEM was 15.

FIG. 5B is a schematic diagram showing a cut surface of the crystalline polymer microporous membrane having asymmetric pores of Example 1 after being subjected to the functionalization process (after hydrophilization). When the average pore diameter on the first surface of the crystalline polymer microporous membrane having the asymmetric pores after being subjected to the functionalization process (after hydrophilization) was determined as $d_3'$, and the average pore diameter on the second surface thereof was determined as $d_4'$ in FIG. 5B, the ratio $(d_3'/d_4')$ of $d_3'$ to $d_4'$ on the observed SEM was 15.9.

Therefore, in Example 1, the value of $(d_3'/d_4')/(d_3/d_4)$ was 1.06.

Based on the comparison between the ratio $(d_3'/d_4')$ of the crystalline polymer microporous membrane of Example 1 after being subjected to the functionalization process (after hydrophilization) and the ratio $(d_3/d_4)$ of the crystalline polymer microporous film thereof before being subjected to the functionalization process (before hydrophilization), it was found that the ratio of the average pore diameter of the first surface (unheated surface) to the average pore diameter of the second surface (heated surface) was increased as a result of the functionalization process (hydrophilization).

This result had not been expected before the observation of the SEM image, and this result was attained, since in addition to that the average pore diameter of the crystalline polymer microporous membrane 50 continuously changed from the first surface to the second surface, the thickness of the hydrophilic covering portion 55 after functionalization process (hydrophilization) using at least the fluorine alcohol continuously changed and gradually increased from the first surface to the second surface. The crystalline polymer covered with the fluorine alcohol became thicker than the course filtering portion at the side of the first surface (unheated surface) of the crystalline polymer microporous membrane, as it was closer to the fine portion at the side of the second surface (heated surface) thereof, and thus a significant asymmetric pore structure, in which the degree of the continuous change in the average pore diameter from the first surface to the second surface was enlarged, could be formed.

Based on the result described above, it was made clear that the crystalline polymer microporous membrane of Example 1 had high hydrophilicity and could significantly prolong a lifetime as a filtration filter (filtration rate), which would be ended by clogging, because the ratio of the average pore diameter of the first surface to the average pore diameter of the second surface was large.

<Evaluation on Hydrophilicity>

The crystalline polymer microporous membranes of Examples 1 to 4 and Comparative Examples 1 to 3 were evaluated in terms of hydrophilicity.

The evaluation for hydrophilicity was carried out with reference to the evaluation method disclosed in Japanese Patent (JP-B) No. 3075421. Specifically, the initial hydrophilicity was evaluated in the following manner.

A droplet of water was dropped onto a surface of a sample from the height of 5 cm, and the time required for the sample to absorb the droplet was measured. The measurement results were evaluated based on the evaluation criteria presented below. The results are shown in Table 1.

A: Absorbed immediately.
B: Naturally absorbed.
C: Absorbed only when pressure was applied, or not absorbed though the contact angle was reduced.
D: Not absorbed, i.e. repelling water.

Note that, the state of D is one of characteristics of a porous fluororesin material.

<Filtering Test>

A filtering test was performed on the crystalline polymer microporous membranes of Examples 1 to 4, and Comparative Examples 1 to 3. A test solution containing 0.01% by mass of polystyrene latex (average particle size of 1.5 μm) was filtered through each of the membranes of Examples 1 to 4, and Comparative Examples 1 to 3, with a differential pressure of 10 kPa, and an amount of the solution filtered until the filter was clogged was measured. The results are shown in Table 1.

<Flow Rate Test>

A flow rate test was performed on the crystalline polymer microporous membranes of Examples 1 to 4, and Comparative Examples 1 to 3 in the following manner.

A flow rate was measured in accordance with JIS K3831 under the following conditions. The test method was "pressure filtration test", and a sample was cut out in a circular shape having a diameter of 13 mm and set in a stainless holder for the measurement. By using ion-exchanged water as a test solution, the time required for filtering 100 mL of the test solution under a pressure of 10 kPa was measured, and the flow rate (L/min·m$^2$) was calculated. The results are shown in Table 1.

TABLE 1

| | Hydrophilicity | Filtering Test (mL/cm$^2$) | Flow Rate Test (L/min · m$^2$) |
|---|---|---|---|
| Example 1 | A | 221 | 89 |
| Example 2 | A | 296 | 178 |
| Example 3 | A | 230 | 163 |
| Example 4 | A | 210 | 142 |
| Comparative Example 1 | D | NA | NA |
| Comparative Example 2 | D | NA | NA |
| Comparative Example 3 | A | 80 | 69 |

Note that, in Table 1, "NA" means that the evaluation could not be carried out because of poor hydrophilicity.

Based on the results shown in Table 1, it could be seen that the crystalline polymer microporous membranes of Examples 1 to 4 and Comparative Example 3 were hydrophilic, and that the crystalline polymer microporous membranes of Comparative Examples 1 and 2 showed no hydrophilicity at all.

In the filtering test, as the crystalline polymer microporous membranes of Comparative Examples 1 and 2 did not have any hydrophilicity, and thus the measurement could not be performed.

On the other hand, the crystalline polymer microporous membranes of Examples 1 to 4 each required no pretreatment of hydrophilization with isopropanol which had been conventionally needed, and could filter through the test solution of 100 mL/cm$^2$ or more. Therefore, it was found that the crystalline polymer microporous membrane of the present invention could significantly improve filtration lifetime.

In the flow rate test, as the crystalline polymer microporous membranes of Comparative Examples 1 and 2 did not have any hydrophilicity, and thus the measurement could not be performed. On the other hand, the crystalline polymer microporous membranes of Examples 1 to 4 each were 80 L/min·m$^2$ or more. Therefore, it was found that the crystalline polymer microporous membrane of the present invention could significantly improve the flow rate.

It was considered that the filtration lifetime and the flow rate were improved because the filtration ability of foams was improved so that clogging caused by foams was reduced.

<Evaluation on Water Resistance>

Water (200 mL) was passed through each of the crystalline polymer microporous membranes of Examples 1 to 4, and Comparative Examples 1 to 3 at the pressure of 100 kPa. This process was carried out 5 times, and the membrane was dried every time water was passed through the membrane.

Water resistance of the crystalline polymer microporous membranes of Examples 1 to 4, and Comparative Examples 1 to 3 were each evaluated by evaluating the membranes after the aforementioned procedure based on the evaluation criteria (A to D) used for the evaluation for the hydrophilicity. The results are shown in Table 2.

<Evaluation on Acid Resistance>

Acid resistance of each of the crystalline polymer microporous membranes of Examples 1 to 4, and Comparative Examples 1 to 3 was evaluated by immersing each membrane in a 1N aqueous hydrochloric acid solution having the temperature of 80° C. for 5 hours, then evaluating the membrane based on the evaluation criteria (A to D) used for the evaluation for the hydrophilicity. The results are shown in Table 2.

<Evaluation on Alkali Resistance>

Alkali resistance of each of the crystalline polymer microporous membranes of Examples 1 to 4, and Comparative Examples 1 to 3 was evaluated by immersing each membrane in a 1N aqueous sodium hydroxide solution having the temperature of 80° C. for 5 hours, then evaluating the membrane based on the evaluation criteria (A to D) used for the evaluation for the hydrophilicity. The results are shown in Table 2 below.

<Evaluation on Chemical Resistance>

Chemical Resistance of each of the crystalline polymer microporous membranes of Examples 1 to 4 and Comparative Examples 1 to 3 was evaluated by immersing each membrane in a methanol solution for 1 hour, then evaluating the membrane based on the evaluation criteria (A to D) used for the evaluation for the hydrophilicity. The results are shown in Table 2 below.

TABLE 2

| | Water Resistance | Acid Resistance | Alkali Resistance | Chemical Resistance |
|---|---|---|---|---|
| Example 1 | A | A | A | A |
| Example 2 | A | A | A | A |
| Example 3 | A | A | A | A |
| Example 4 | A | A | A | A |
| Comparative Example 1 | D | D | D | D |
| Comparative Example 2 | D | D | D | D |
| Comparative Example 3 | A | A | A | A |

Based on the results shown in Table 2, it could be seen that the crystalline polymer microporous membranes of Examples 1 to 4 and Comparative Example 3 had water resistance, acid resistance, alkali resistance, and chemical resistance, and that the crystalline polymer microporous membranes of Comparative Examples 1 and 2 did not have any water resistance, acid resistance, alkali resistance, and chemical resistance.

<Evaluation on Ion Adsorption Ability>

With reference to JP-A No. 02-187136, ion adsorption ability of each of the crystalline polymer microporous membranes of Examples 1 to 4 and Comparative Examples 1 to 3 was evaluated. Specifically, 50 mL of an aqueous solution containing 10 ppm of each metal ion (copper chloride, nickel chloride) was prepared, and the aqueous solution was made permeated each of the crystalline polymer microporous membranes of Examples 1 to 4 and Comparative Examples 1 to 3, and then the concentration of the metal ion contained in the aqueous solution after permeation was measured. The results are shown in Table 3.

TABLE 3

| | Copper chloride | Nickel chloride |
|---|---|---|
| Straight | 10 ppm | 10 ppm |
| Example 1 | 10 ppm | 10 ppm |
| Example 2 | less than 1 ppm | less than 1 ppm |
| Example 3 | 10 ppm | 10 ppm |
| Example 4 | less than 1 ppm | less than 1 ppm |
| Comparative Example 1 | NA | NA |
| Comparative Example 2 | NA | NA |
| Comparative Example 3 | less than 1 ppm | less than 1 ppm |

Note that, in Table 3, "NA" means that the evaluation could not be carried out because of poor hydrophilicity.

Based on the results shown in Table 3, it could be seen that the crystalline polymer microporous membranes of Examples 1 to 4 and Comparative Example 3 had the ion adsorption ability, and that Comparative Examples 1 and 2 did not have any ion adsorption ability.

Example 5

Formation of Filter Cartridge

The crystalline polymer microporous membrane of Example 2 was placed in between two pieces of polypropylene nonwoven fabrics, pleated so as to have a pleat width of 10.5 mm, and provided with 138 folds and formed into a cylindrical shape. The joint was fused using an impulse sealer so as to form a cylindrical object. Both ends of the cylindrical object were cut by 2 mm each, and the cut surfaces were thermally fused with polypropylene end plates so as to prepare an element exchange type filter cartridge.

Since the filter cartridge of the present invention used the hydrophilic crystalline polymer microporous membrane, no complicated pre-hydrophilization treatment in an aqueous system was necessary. Moreover, the filter cartridge had excellent solvent resistance, as the used crystalline polymer microporous membrane contained a crystalline polymer. Also, since the crystalline polymer microporous membrane had an asymmetric pore structure, the flow rate was high, clogging hardly arose and a long filtration lifetime was obtained.

The crystalline polymer microporous membrane of the present invention and filtration filter using the crystalline polymer microporous membrane, which can efficiently capture fine particles for a prolonged period, and are superior in heat resistance and chemical resistance, so that they can be used in a variety of situations where filtration is required, notably in microfiltration of gases, liquids, etc. For instance, the crystalline polymer microporous membrane and the filtration filter can be widely used for filtration of corrosive gases and gases for use in the semiconductor industry, filtration and sterilization of cleaning water for use in the electronics industry, water for medical uses, water for pharmaceutical production processes and water for foods and drinks, high-temperature filtration and filtration of reactive chemicals.

What is claimed is:

1. A crystalline polymer microporous membrane comprising:
    a crystalline polymer microporous film containing a crystalline polymer, and having an asymmetric pore structure;
    fluorine alcohol covering at least part of an exposed surface of the crystalline polymer microporous film;
    a crosslinking agent, wherein the fluorine alcohol is crosslinked with assistance of the crosslinking agent; and
    a functional compound, which is attached to part of at least one of the crosslinking agent and the fluorine alcohol by addition reaction,
    wherein the crosslinking agent and the functional compound are parts of the crystalline polymer microporous membrane.

2. The crystalline polymer microporous membrane according to claim 1, wherein the fluorine alcohol contains two or more hydroxyl groups.

3. The crystalline polymer microporous membrane according to claim 1, wherein the crosslinking agent is a polyfunctional epoxy compound having two or more functional groups per molecule.

4. The crystalline polymer microporous membrane according to claim 1, wherein at least part of the exposed surface of the crystalline polymer microporous film is covered with the functional compound.

5. The crystalline polymer microporous membrane according to claim 4, wherein the functional compound contains at least one selected from the group consisting of an ion-exchange group, a chelate group, and derivatives thereof, and contains a reactive group which reacts with at least one of the fluorine alcohol and the crosslinking agent.

6. The crystalline polymer microporous membrane according to claim 5, wherein the reactive group is at least one selected from the group consisting of an amino group, a hydroxyl group, an epoxy group and derivatives thereof.

7. The crystalline polymer microporous membrane according to claim 1, wherein the crystalline polymer forming the crystalline polymer microporous membrane is at least one selected from the group consisting of polytetrafluoroethylene, polyvinylidene fluoride, a tetrafluoroethylene-perfluoroalkylvinyl ether copolymer, a tetrafluoroethylene-hexafluoropropylene copolymer, a tetrafluoroethylene-ethylene copolymer, polychlorotrifluoroethylene, a chlorotrifluoroethylene-ethylene copolymer, polyethylene, polypropylene, nylon, polyacetal, polybutylene terephthalate, polyethylene terephthalate, syndiotactic polystyrene, polyphenylene sulfide, polyether ether ketone, wholly aromatic polyamide, wholly aromatic polyester, and polyethernitrile.

8. The crystalline polymer microporous membrane according to claim 1, wherein the crystalline polymer microporous membrane has a plurality of pores, where the average pore diameter of a first surface of the crystalline polymer microporous membrane is larger than that of a second surface thereof, and the average pore diameter of the crystalline polymer microporous membrane continuously changes from the first surface thereof to the second surface thereof.

9. The crystalline polymer microporous membrane according to claim 8, wherein the second surface is a heating surface.

10. The crystalline polymer microporous membrane according to claim 1, wherein the crystalline polymer microporous membrane is a membrane obtained by heating one surface of the film containing the crystalline polymer so as to form a semi-baked film with a temperature gradient in the thickness direction thereof, and drawing the semi-baked film.

11. A method for producing a crystalline polymer microporous membrane, comprising:
    applying at least fluorine alcohol and a crosslinking agent to at least part of an exposed surface of a crystalline polymer microporous film;
    crosslinking the fluorine alcohol with assistance of the crosslinking agent, wherein the crystalline polymer microporous film has an asymmetric pore structure; and
    allowing a functional compound to initiate an addition reaction with part of at least one of the crosslinking agent and the fluorine alcohol such that the functional compound and the crosslinking agent are parts of the crystalline polymer microporous membrane.

12. The method for producing a crystalline polymer microporous membrane according to claim 11, wherein the fluorine alcohol contains two or more hydroxyl groups per molecule.

13. The method for producing a crystalline polymer microporous membrane according to claim 11, wherein the crosslinking agent is a polyfunctional epoxy compound having two or more functional groups per molecule.

14. The method for producing a crystalline polymer microporous membrane according to claim 11, wherein the functional compound contains at least one selected from the group consisting of an ion-exchange group, a chelate group, and derivatives thereof, and contains a reactive group which reacts with at least one of the fluorine alcohol and the crosslinking agent.

15. The method for producing a crystalline polymer microporous membrane according to claim 14, wherein the reactive group is at least one selected from the group consisting of an amino group, a hydroxyl group, an epoxy group and derivatives thereof.

16. A filtration filter, comprising:
    a crystalline polymer microporous membrane, which comprises:
    a crystalline polymer microporous film containing a crystalline polymer, and having an asymmetric pore structure;
    fluorine alcohol covering at least part of an exposed surface of the crystalline polymer microporous film;

a crosslinking agent, wherein the fluorine alcohol is crosslinked with assistance of the crosslinking agent; and a functional compound, which is attached to part of at least one of the crosslinking agent and the fluorine alcohol by addition reaction, wherein the crosslinking agent and the functional compound are parts of the crystalline polymer microporous membrane.

17. The filtration filter according to claim 16, wherein the crystalline polymer microporous membrane has a pleated shape.

18. The filtration filter according to claim 16, wherein the crystalline polymer microporous membrane has a plurality of pores, where the average pore diameter of the first surface of the crystalline polymer microporous membrane is larger than that of the second surface thereof, and the average pore diameter of the crystalline polymer microporous membrane continuously changes from the first surface thereof to the second surface thereof, and the first surface of the crystalline polymer microporous membrane is a filtering surface.

* * * * *

UNITED STATES PATENT AND TRADEMARK OFFICE
CERTIFICATE OF CORRECTION

| | | |
|---|---|---|
| PATENT NO. | : 8,739,976 B2 | Page 1 of 1 |
| APPLICATION NO. | : 12/954297 | |
| DATED | : June 3, 2014 | |
| INVENTOR(S) | : Kenichi Ishizuka et al. | |

It is certified that error appears in the above-identified patent and that said Letters Patent is hereby corrected as shown below:

On the Title Page, Item (54) and in the Specification, Col. 1, Lines 1-3, should read
CRYSTALLINE POLYMER MICROPOROUS MEMBRANE, METHOD FOR PRODUCING THE SAME, AND FILTRATION FILTER Signed and Sealed this
Ninth Day of September, 2014

Michelle K. Lee
*Deputy Director of the United States Patent and Trademark Office*